(12) United States Patent
Kimura et al.

(10) Patent No.: US 12,444,735 B2
(45) Date of Patent: Oct. 14, 2025

(54) Si ALLOY POWDER FOR NEGATIVE ELECTRODE

(71) Applicant: DAIDO STEEL CO., LTD., Nagoya (JP)

(72) Inventors: Yuta Kimura, Nagoya (JP); Kyohei Shimomura, Nagoya (JP); Hiroyuki Ohisa, Nagoya (JP)

(73) Assignee: Daido Steel Co., Ltd., Nagoya (JP)

( * ) Notice: Subject to any disclaimer, the term of this patent is extended or adjusted under 35 U.S.C. 154(b) by 141 days.

(21) Appl. No.: 18/227,319

(22) Filed: Jul. 28, 2023

(65) Prior Publication Data

US 2024/0038976 A1 Feb. 1, 2024

(30) Foreign Application Priority Data

Jul. 29, 2022 (JP) .................................. 2022-121838
Mar. 24, 2023 (JP) .................................. 2023-048355

(51) Int. Cl.
  *H01B 1/04* (2006.01)
  *C01B 33/06* (2006.01)
  *H01M 4/38* (2006.01)
  *H01M 4/02* (2006.01)

(52) U.S. Cl.
  CPC ............. *H01M 4/386* (2013.01); *C01B 33/06* (2013.01); *H01B 1/04* (2013.01); *C01P 2002/70* (2013.01); *C01P 2006/40* (2013.01); *H01M 2004/021* (2013.01); *H01M 2004/027* (2013.01)

(58) Field of Classification Search
  CPC .. H01B 1/00; H01B 1/04; H01B 1/06; H01M 4/36; H01M 4/38; H01M 4/587; C01B 33/02; C01B 33/06
  See application file for complete search history.

(56) References Cited

U.S. PATENT DOCUMENTS

| | | | |
|---|---|---|---|
| 9,406,933 B2 * | 8/2016 | Jeong | ................. C22C 1/03 |
| 9,508,990 B2 * | 11/2016 | Hirono | ................. C22C 28/00 |
| 11,862,787 B2 * | 1/2024 | Kimura | ................. H01M 4/386 |

(Continued)

FOREIGN PATENT DOCUMENTS

| | | |
|---|---|---|
| JP | 2017-224499 A | 12/2017 |
| KR | 10-2013-0035930 A | 4/2013 |
| KR | 10-2014-0039329 A | 4/2014 |

OTHER PUBLICATIONS

Chae et al "Micron-sized Fe—Cu—Si ternary composite anodes for high energy Li-ion batteries", Energy Environ. Sci., 2016, 9, 1251.*

(Continued)

*Primary Examiner* — Mark Kopec
(74) *Attorney, Agent, or Firm* — McGinn I.P. Law Group, PLLC

(57) ABSTRACT

A Si alloy powder for a negative electrode, the Si alloy powder including: a Si phase; a SiX compound phase; and at least one selected from the group consisting of a SnY compound phase and a AlY compound phase, in which the element Y in the SnY compound phase and the AlY compound phase includes at least one element selected from the group consisting of Cu, Fe, Ni, Cr, Co, Mn, Zr, and Ti, the Si alloy powder has an average particle diameter of 30 μm or less, and an amount of the Si phase in an entire Si alloy is 30 mass % to 95 mass %.

7 Claims, 2 Drawing Sheets

(56) References Cited

U.S. PATENT DOCUMENTS

| | | | | |
|---|---|---|---|---|
| 2005/0042128 A1* | 2/2005 | Matsubara | ............. | C22C 29/18 |
| | | | | 419/66 |
| 2013/0084498 A1* | 4/2013 | Kimura | ................ | H01M 4/622 |
| | | | | 429/217 |
| 2014/0370386 A1 | 12/2014 | Hirono et al. | | |
| 2020/0251723 A1* | 8/2020 | Kimura | ................ | H01M 4/364 |
| 2020/0287204 A1* | 9/2020 | Kawaura | ................ | H01G 11/30 |

OTHER PUBLICATIONS

Hou et al."Mechanochemical synthesis of Si/ Cu3Si-based composite as negative electrode materials for lithium ion battery", Scientific Reports | (2018) 8:12695 | DOI: 10.1038/s41598-018-30703-3.*

Korean Office Action for Korean Patent Application No. 10-2023-0098582 dated Apr. 30, 2025 with English Translation.

* cited by examiner

Si ALLOY POWDER FOR NEGATIVE ELECTRODE

CROSS-REFERENCE TO RELATED APPLICATIONS

This application is based on and claims priority under 35 USC 119 from Japanese Patent Applications No. 2022-121838 filed on Jul. 29, 2022 and No. 2023-048355 filed on Mar. 24, 2023, the contents of which are incorporated herein by reference.

TECHNICAL FIELD

This invention relates to a Si alloy powder for a negative electrode.

BACKGROUND ART

A lithium-ion battery has an advantage of being able to miniaturize with a high capacity and a high voltage, and is widely used as a power supply for mobile phones and laptops. In recent years, it has attracted much expectations as a power supply for power applications such as electric vehicles and hybrid vehicles, and the development thereof has been actively promoted.

In the lithium-ion battery, lithium ions (hereinafter may be referred to as Li ions) move between a positive electrode and a negative electrode for charging and discharging. On a negative electrode side, Li is occluded in a negative electrode active material during charging, and Li is released as an ion from the negative electrode active material during discharging.

In the related art, lithium cobaltate ($LiCoO_2$) is generally used as an active material on a positive electrode side, and graphite is widely used as the negative electrode active material. However, graphite as the negative electrode active material has a theoretical capacity of only 372 mAh/g, and an increased capacity is desired.

Patent Literature 1: JP2017-224499A

SUMMARY OF THE INVENTION

As an alternative to a carbon-based electrode material, a metal material such as Si (the theoretical capacity of Si is 4198 mAh/g) that can be expected to have an increased capacity has been studied. Si has large volume expansion and contraction along with occlusion and release of Li due to occlusion of Li by an alloying reaction with Li. Therefore, there is a problem that cycle characteristics, which are capacity maintenance characteristics during repeated charging and discharge, deteriorate by Si particles cracking or peeling off from a current collector.

In order to solve such a problem, it has been proposed to miniaturize Si itself and reduce an expansion amount thereof, or to alloy Si (see, for example, Patent Literature 1 above). However, such improving the cycle characteristics may reduce an initial discharge capacity, and there is still room for improvement in improving battery characteristics in consideration of the initial discharge capacity and the cycle characteristics.

The present invention has been made in view of the above circumstances, and an object thereof is to provide a novel Si alloy powder for a negative electrode that can improve battery characteristics in consideration of an initial discharge capacity and cycle characteristics.

A Si alloy powder for a negative electrode according to the present invention is a Si alloy powder including:
a Si phase;
a SiX compound phase; and
at least one selected from the group consisting of a SnY compound phase and a AlY compound phase, in which
the element Y in the SnY compound phase and the AlY compound phase includes at least one element selected from the group consisting of Cu, Fe, Ni, Cr, Co, Mn, Zr, and Ti,
the Si alloy powder has an average particle diameter of 30 μm or less, and
an amount of the Si phase in an entire Si alloy is 30 mass % to 95 mass %.

The Si alloy powder for a negative electrode according to the present invention,
in which element X in the SiX compound phase includes at least one element selected from the group consisting of B, C, Mg, Ca, and V.

The Si alloy powder for a negative electrode according to the present invention,
in which the element X in the SiX compound phase includes at least one element selected from the group consisting of Sr, Y, Nb, Mo, and Ba.

The Si alloy powder for a negative electrode according to the present invention,
in which the element X in the SiX compound phase includes at least one element selected from the group consisting of Ta, W, La, Ce, and Nd.

The Si alloy powder for a negative electrode according to the present invention,
in which the element X in the SiX compound phase includes at least one element selected from the group consisting of Sm, Hf, Ru, and Cu.

The Si alloy powder for a negative electrode specified in this way can be used as a negative electrode active material of a lithium-ion battery to improve battery characteristics in consideration of an initial discharge capacity and cycle characteristics.

Here, in the Si alloy powder for a negative electrode according to the present invention, the particle diameter thereof and the ratio of each compound are adjusted, whereby the battery characteristics can be further improved.

For example, a mass ratio represented by [SiX compound]/([SnY compound]+[AlY compound]) may be 0.1 to 39 when [M compound] represents a content of a M compound in mass % basis.

In addition, the average particle diameter may be 1 μm or less, and the mass ratio represented by [SiX compound]/([SnY compound]+[AlY compound]) may be 1 to 39 when [M compound] represents a content of a M compound in mass % basis.

In addition, the Si phase, the SiX compound phase, and the at least one selected from the group consisting of a SnY compound phase and an AlY compound phase may be separately present in a separate state.

In this case, when average particle diameters of the Si phase, the SiX compound phase, and the SnY compound phase are respectively mdSi, mdSiX, and mdSnY, the average particle diameters mdSi, mdSiX, and mdSnY may be all within a range of 0.1 μm to 30 μm, and average particle diameter ratios represented by mdSi/mdSiX and mdSi/mdSnY may be both within a range of 0.1 to 5.0, whereby the cycle characteristic can be further improved.

DESCRIPTION OF EMBODIMENTS

Figure 1A:
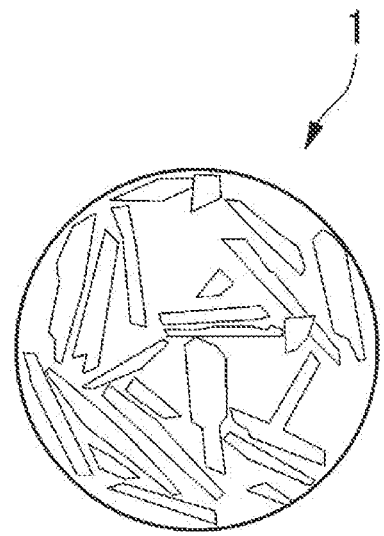
FIG. 1A is a schematic diagram illustrating a Si alloy particle of a Si alloy powder for a negative electrode according to one embodiment of the present invention, that has a Si phase, a SiX compound phase and a SnY compound phase.

Next, a Si alloy powder for a negative electrode according to one embodiment of the present invention (hereinafter may be simply referred to as a Si alloy powder for a negative electrode), and a lithium-ion battery using the present Si alloy powder for a negative electrode (hereinafter may be simply referred to as a battery) in a negative electrode are specifically described.

1. Si Alloy Powder for Negative Electrode

The present Si alloy powder for a negative electrode includes Si, at least one of Sn and Al, an element X, and an element Y as main constituent elements. Here, the element X is one or more elements selected from the group consisting of B, C, Mg, Ca, V, Sr, Y, Nb, Mo, Ba, Ta, W, La, Ce, Nd, Sm, Hf, Ru, and Cu, and the element Y is one or more elements selected from the group consisting of Cu, Fe, Ni, Cr, Co, Mn, Zr, and Ti.

Elements other than these main constituent elements (Si, Sn, Al, element X, and element Y) are not included except for inevitable ones. Examples of elements for inevitable impurities include nitrogen (N), sulfur (S), and phosphorus (P). The respective upper limits are N≤0.10 mass %, S≤0.10 mass %, and P≤0.10 mass %.

The present Si alloy powder for a negative electrode includes, as a metal microstructure, a Si phase, a SiX compound phase, and at least one of a SnY compound phase and an AlY compound phase. As long as a proportion of non-compound Sn (Sn phase) or the like is 5 mass % or less, the non-compound Sn or the like may be included as an impurity.

The Si phase is a phase that mainly includes Si. From the viewpoint that a Li occlusion amount increases, Si phase preferably includes a single phase of Si. However, the Si phase may include inevitable impurities.

In the present Si alloy powder for a negative electrode, in the case where a proportion of the Si phase that occludes Li ions is low, an initial discharge capacity decreases. Therefore, in the present embodiment, an amount of the Si phase is 30 mass % or more. The amount of the Si phase is preferably 50 mass % or more.

However, in the case where the proportion of the Si phase is high, a proportion of the SiX compound phase decreases relatively and cycle characteristics deteriorate. Therefore, in the present embodiment, the amount of the Si phase is 95 mass % or less. The amount of the Si phase is preferably 80 mass % or less, and more preferably 70 mass % or less.

On the other hand, a SiX compound constituting the SiX compound phase has a poor Li occlusion property and has very little expansion due to a reaction with Li ions. Therefore, the SiX compound phase plays the role of a skeleton that maintains an electrode structure. In order to obtain such an effect, a proportion of the SiX compound in the entire Si alloy is preferably 1 mass % or more. The proportion of the SiX compound in the entire Si alloy is more preferably 3 mass % or more, and further preferably 15 mass % or more. However, in the case where the proportion of the SiX compound is high, the initial discharge capacity decreases, so that the proportion of the SiX compound in the entire Si alloy is preferably 70 mass % or less. The proportion of the SiX compound in the entire Si alloy is more preferably 40 mass % or less, and further preferably 35 mass % or less.

The SiX compound phase in the present Si alloy powder for a negative electrode can include only one type of compound, and can also include two or more types of compounds, such as a SiV compound and a SiB compound.

On the other hand, a SnY compound constituting the SnY compound phase and a AlY compound constituting the AlY compound phase have a theoretical capacity lower than that of Si and higher than that of the SiX compound, and a Li ion diffusion path is easy to ensure through the SnY compound phase (or the AlY compound phase). Therefore, with a configuration that includes at least one of the SnY compound phase and the AlY compound phase, a concentration of Li occluded can be made uniform.

Since a degree of expansion due to the reaction with Li is smaller than that of Si simple substance having high reactivity with Li, the formation of the SnY compound phase (or the AlY compound phase) can reduce the adverse influence on the cycle characteristics.

In the present embodiment, a total amount of the SnY compound and the AlY compound in the entire Si alloy is preferably 0.1 mass % or more. The total amount of the SnY compound and the AlY compound in the entire Si alloy is more preferably 1 mass % or more, and further preferably 2 mass % or more.

On the other hand, regarding the upper limit of content of the compounds, the total content of the SnY compound and the AlY compound in the entire Si alloy is preferably 20 mass % or less. The total amount of the SnY compound and the AlY compound in the entire Si alloy is more preferably 10 mass % or less, and further preferably 9 mass % or less.

Similar to the case of the SiX compound phase, each of the SnY compound phase and the AlY compound phase can include only one type of compound, and can include two or more types of compounds.

As described above, the SiX compound, the SnY compound, and the AlY compound play different roles, and battery characteristics can be improved by including these compounds at predetermined proportions.

Specifically, in the case where a mass ratio represented by [SiX compound]/([SnY compound]+[AlY compound]) is small, that is, in the case where the total content of the SnY compound and the AlY compound is relatively large, the influence of the SnY compound and the AlY compound that expand more due to a reaction with Li increases, and the cycle characteristics deteriorate.

[M compound] represents a content of a M compound in mass % basis.

On the other hand, in the case where the mass ratio is large, that is, in the case where the total content of the SnY compound and the AlY compound is relatively small, diffusibility of Li ions decreases and the concentration of Li occluded in the Si phase is non-uniform, so that a high stress is locally generated in a portion where the concentration of Li is high, and as a result, cracking of the powder particles is promoted and the cycle characteristics deteriorate. Therefore, in the present embodiment, the mass ratio represented by [SiX compound]/([SnY compound]+[AlY compound]) may be within a range of 0.1 to 39 when [M compound] represents a content of a M compound in mass % basis. The mass ratio is preferably 1 or more, and more preferably 2 or more. In addition, the mass ratio is preferably 10 or less, and more preferably 8 or less.

The content of each main element suitable for obtaining the above composition phase is as follows. In the following description, "%" means "mass %" unless otherwise specified.

In the case where the content of Si is small, the initial discharge capacity decreases. However, in the case where the content is too large, the cycle characteristics deteriorate. Therefore, Si is preferably included in a content range of 50% or more, more preferably 60% or more, and further preferably 71% or more. In addition, Si is preferably included in a content range of 95% or less. Si is more preferably included in a content range of 80% or less.

In the case where the content of the element X is small, the cycle characteristics deteriorate. However, in the case where the content thereof is too large, the initial discharge capacity decreases. Therefore, the element X is preferably included in a content range of 1% or more. The element X is more preferably included in a content range of 5% or more. In addition, the element X is preferably included in a content range of 30% or less. The element X is more preferably included in a content range of 20% or less.

In the case where the content of the element Y is small, the effect of a Li diffusion path cannot be obtained. However, in the case where the content is too large, the expansion due to the SnY compound or the AlY compound increases and the cycle characteristics deteriorate. Therefore, the element Y is preferably included in a content range of 0.1% or more. The element Y is more preferably included in a content range of 1% or more. In addition, the element Y is preferably included in a content range of 15% or less. The element Y is more preferably included in a content range of 10% or less.

The present Si alloy powder for a negative electrode thus configured has an average particle diameter (median diameter d50) of 30 μm or less. The average particle diameter thereof is more preferably 1 μm or less. This is because an expansion amount of the Si phase is prevented by miniaturization, and collapse is prevented. However, in the case where the particle diameter is too small, a specific surface area of the Si alloy powder increases (an area in contact with an electrolyte increases), which increases an amount of irreversible reaction that occurs on the surface. Therefore, the average particle diameter (d50) thereof is preferably 0.1 μm or more. Here, the average particle diameter (d50) means a volume-based average diameter, and can be measured using a laser diffraction/scattering particle distribution analyzer.

Next, a method for producing the present Si alloy powder for a negative electrode is described.

Respective raw materials are weighed out such that a predetermined chemical composition is obtained, and a molten alloy obtained by melting the weighed raw materials using a melting device such as an arc furnace, a high frequency induction furnace, or a heating furnace is quenched using an atomization method, to thereby obtain the Si alloy as a quenched alloy.

In the atomization method, a gas such as $N_2$, Ar, He is sprayed at a high pressure (for example, 1 MPa to 10 MPa) against the molten alloy that is discharged into an atomization chamber and that continuously (rod-like) flows downward, and the molten metal is pulverized and cooled. The cooled molten metal approaches a spherical shape while free-falling in the atomization chamber in a semi-molten state, and Si alloy particles are obtained. The Si phase, the SiX compound phase, and the SnY compound phase are formed in the microstructure of the Si alloy particle.

In the atomization method, high-pressure water may be sprayed instead of a gas from the viewpoint of improving a cooling effect. In some cases, it is also possible to obtain a foiled Si alloy by using a roll quenching method instead of the atomization method.

Next, the Si alloy particles can be finely pulverized using a wet pulverization method to thereby obtain the present Si alloy powder for a negative electrode.

As the wet pulverization method, a wet pulverization method using a bead mill or a planetary ball mill can be used. In wet pulverization, a solvent is used together with the Si alloy particles to be pulverized. As the solvent, ethanol, methanol, isopropyl alcohol, Naphthesol, and the like can be used. In addition, a dispersant can also be added.

After the wet pulverization, the solvent is removed by flowing an inert gas such as argon to the pulverized material or by performing vacuum drying, thereby obtaining the present Si alloy powder for a negative electrode that is finely pulverized.

Figure 1B:
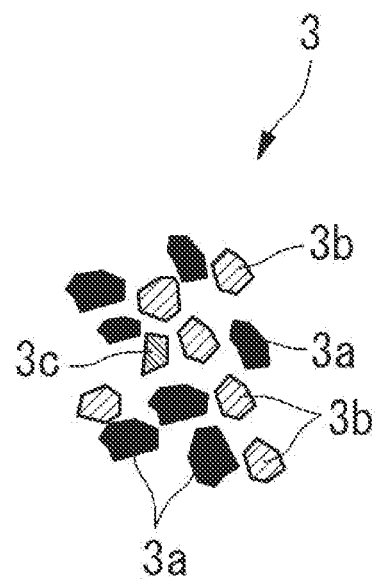
FIG. 1B is a schematic diagram illustrating a Si alloy powder for a negative electrode according to another embodiment of the present invention, which is obtained by finely pulverizing the Si alloy particle shown in FIG. 1A.

FIG. 1B is a schematic diagram illustrating a Si alloy powder for a negative electrode according to another embodiment of the present invention.

As shown in FIG. 1B, in a Si alloy powder for a negative electrode 3, a Si phase 3a, a SiX compound phase 3b, and a SnY compound phase 3c are separately present in a separate state. When average particle diameters of the Si phase 3a, the SiX compound phase 3b, and the SnY compound phase 3c are respectively mdSi, mdSiX, and mdSnY, the average particle diameters mdSi, mdSiX, and mdSnY may be all within a range of 0.1 μm to 30 μm.

The "particle diameter" here means the diameter of a circle having the same area, i.e., diameter of equivalent circle, obtained by measuring the area of each phase constituting the present Si alloy powder for a negative electrode under electron microscope observation. In addition, the "average particle diameter" refers to an average particle diameter (median diameter d50) analyzed for 100 particles from a cross-sectional SEM image (5000 times) of each powder for the Si phase, the SiX compound phase, and the SnY compound phase.

In the present Si alloy powder for a negative electrode, since the Si phase is present independently of others, i.e., SiX compound phase and the SnY compound phase, a space that allows expansion of Si tends to be formed around the Si phase. This space serves as a buffer region against the expansion of Si and can prevent the collapse of the SiX compound phase that serves as a skeleton in the electrode, and therefore the cycle characteristics can be improved.

Figure 2:
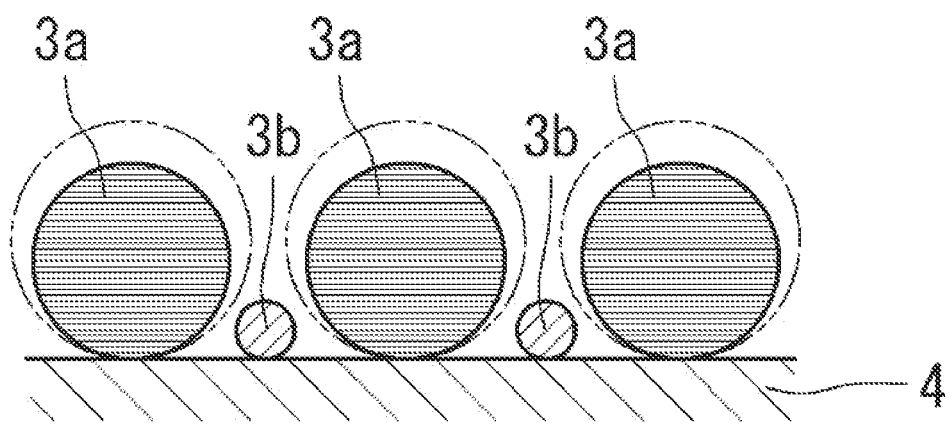
FIG. 2 is a schematic diagram illustrating an effect of the Si alloy powder for a negative electrode shown in FIG. 1B.

However, as shown in FIG. 2, in the case where the particle diameter of the Si phase 3a is excessively larger than that of the SiX compound phase 3b (or SnY compound phase 3c), repeated expansion and contraction of the Si phase 3a causes the electrode to collapse and deteriorates the cycle characteristics. Reference numeral 4 in FIG. 2 denotes a conductive substrate that constitutes a part of the electrode.

Figure 3:
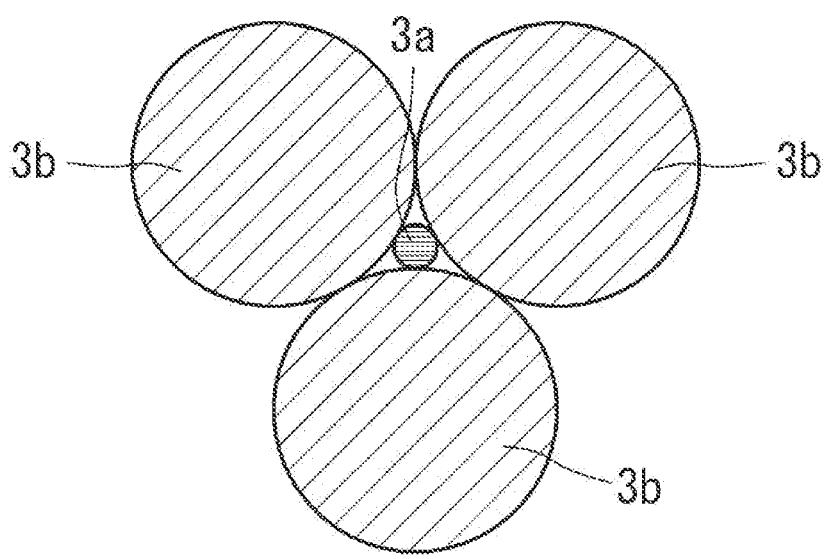
FIG. 3 is a schematic diagram illustrating an effect of the Si alloy powder for a negative electrode shown in FIG. 1B, which is different from FIG. 2.

On the other hand, as shown in FIG. 3, in the case where the particle diameter of the Si phase 3a is excessively smaller than that of the SiX compound phase 3b (or SnY compound phase 3c), the Si phase 3a is surrounded by the SiX compound phase 3b (or SnY compound phase 3c), which hinders the occlusion and release of Li ions in the Si phase 3a, making initial coulombic efficiency and the initial discharge capacity deteriorate.

Therefore, in the present embodiment, in the case where average particle diameter ratios represented by mdSi/mdSiX and mdSi/mdSnY is both within a range of 0.1 to 5.0, deterioration of the initial characteristics (initial discharge capacity, initial coulombic efficiency) and the cycle characteristics is prevented. A more preferred average particle diameter ratio is in a range of 0.3 to 1.5. A further preferred average particle diameter ratio is in a range of 0.5 to 1.2.

The Si alloy powder 3 for a negative electrode according to the present embodiment can be obtained by, using a wet pulverization method, finely pulverizing Si alloy particles 1 (a Si phase, a SiX compound phase, and a SnY compound phase are formed in the microstructure of the Si alloy particles 1) as shown in FIG. 1A that are obtained by an atomization method.

Instead of the method of pulverizing the Si alloy particles 1 having the three phases therein, it is also possible to use a method in which Si particles, SiX compound particles, and SnY compound particles are separately formed directly from a molten metal, these particles are pulverized to a predetermined particle diameter and then mixed.

In the present embodiment, a Si alloy powder for a negative electrode having three phases of a Si phase, a SiX compound phase, and a SnY compound has been exemplified. The Si alloy powder for a negative electrode according to the present embodiment may include an AlY compound phase instead of the SnY compound phase, or may include both the SnY compound phase and the AlY compound phase. When the Si alloy powder for a negative electrode according to the present embodiment includes a AlY compound phase, the average particle diameter mdSnY indicates the average particle diameter of the SnY compound phase and the AlY compound phase.

2. Battery

Next, a battery formed using a negative electrode including the present Si alloy powder for a negative electrode is described.

The negative electrode includes a conductive substrate and a conductive film laminated on a surface of the conductive substrate. The conductive film includes at least the present Si alloy powder for a negative electrode in a binder. The conductive film may also include a conductive agent, if necessary. In the case where a conductive agent is included, it is easier to ensure a conductive path for electrons.

In addition, the conductive film may include an aggregate, if necessary. In the case where an aggregate is included, expansion and contraction of the negative electrode during charging and discharging can be easily prevented, and collapse of the negative electrode can be prevented, so that the cycle characteristics can be further improved.

The conductive substrate functions as a current collector. Examples of a material thereof include Cu, a Cu alloy, Ni, a Ni alloy, Fe, and a Fe-based alloy. Preferably, it is Cu or a Cu alloy. Examples of a specific form of the conductive substrate include a foil form and a plate form. A foil form is preferred from the viewpoint of reducing the volume of the battery and improving the degree of freedom in form.

As the material of the above binder, for example, a polyvinylidene fluoride (PVdF) resin, a fluorine resin such as polytetrafluoroethylene, a polyvinyl alcohol resin, a polyimide resin, a polyamide resin, a polyamideimide resin, a styrene-butadiene rubber (SBR), or polyacrylic acid can be suitably used. These may be used alone or in combination of two or more thereof. Among these, a polyimide resin is particularly preferred because it has high mechanical strength, can withstand volume expansion of the active material, and effectively prevents the conductive film from peeling off from the current collector due to breakage of the binder.

Examples of the above conductive agent include carbon black such as Ketjen black, acetylene black, and furnace black, graphite, carbon nanotubes, and Fullerene. These may be used alone or in combination of two or more thereof. Among these, preferably, Ketjen black, acetylene black, or the like can be suitably used from the viewpoint of being easy to ensure electron conductivity.

From the viewpoint of conductivity improvement, electrode capacity, and the like, a content of the above conductive agent is in a range of preferably 0 to 30 parts by mass, and more preferably 4 to 13 parts by mass, with respect to 100 parts by mass of the present Si alloy powder for a negative electrode. In addition, the average particle diameter (d50) of the above conductive agent is preferably 10 nm to 1 μm, and more preferably 20 nm to 50 nm, from the viewpoint of dispersibility, ease of handling, and the like.

As the above aggregate, a material that does not expand or contract during charging and discharging, or that expands or contracts very little can be suitably used. Examples thereof include graphite, alumina, calcia, zirconia, and activated carbon. These may be used alone or in combination of two or more thereof. Among these, graphite or the like can be suitably used from the viewpoint of conductivity, Li activity, and the like.

From the viewpoint of improving the cycle characteristics, a content of the above aggregate is in a range of preferably 10 to 400 parts by mass, and more preferably 43 to 100 parts by mass, with respect to 100 parts by mass of the present Si alloy powder for a negative electrode. In addition, the average particle diameter of the above aggregate is preferably 10 μm to 50 μm, and more preferably 20 μm to 30 μm, from the viewpoint of functionality as an aggregate, control of an electrode film thickness, and the like. The average particle diameter of the above aggregate is a value measured using a laser diffraction/scattering particle diameter distribution analyzer.

The present negative electrode can be produced by, for example, adding necessary amounts of the present Si alloy powder for a negative electrode, and, if necessary, a conductive agent and an aggregate to a binder dissolved in an appropriate solvent to form a paste, applying the paste to the surface of the conductive substrate, drying it, and optionally subjecting it to compaction, a heat treatment, or the like.

When forming a lithium-ion battery using the present negative electrode, there are no particular limitations on a positive electrode, an electrolyte, a separator, and the like, which are basic components of the battery other than the present negative electrode.

Specific examples of the above positive electrode include a positive electrode in which a layer containing a positive electrode active material such as $LiCoO_2$, $LiNiO_2$, $LiFePO_4$, and $LiMnO_2$ is formed on a surface of a current collector such as an aluminum foil.

Specific examples of the above electrolyte include an electrolytic solution in which a lithium salt is dissolved in a non-aqueous solvent. In addition, it is also possible to use a polymer in which a lithium salt is dissolved, a polymer solid electrolyte in which a polymer is impregnated with the above electrolytic solution, and the like.

Specific examples of the non-aqueous solvent include ethylene carbonate, propylene carbonate, butylene carbonate, dimethyl carbonate, diethyl carbonate, and methyl ethyl carbonate. These may be used alone or in combination of two or more thereof.

Specific examples of the lithium salt include $LiPF_6$, $LiBF_4$, $LiClO_4$, $LiCF_3SO_3$, and $LiAsF_6$. These may be used alone or in combination of two or more thereof.

Other battery components include a separator, a can (battery case), or a gasket. As for these, as long as they are commonly used in the lithium-ion battery, any of them can be appropriately combined to form a battery.

The shape of the battery is not particularly limited, and may be any shape such as a cylindrical shape, rectangular shape, or coin shape, and can be appropriately selected according to a specific application.

EXAMPLES

Hereinafter, the present invention is described more specifically using Examples. "%" in the alloy composition is "mass %" unless otherwise specified.

1. Preparation of Si Alloy Powder for Negative Electrode

Tables 1 and 2 below show alloy compositions of 39 types of Si alloy powders for a negative electrode in Examples and 5 types of Si alloy powders for a negative electrode in Comparative Examples. Respective alloy compositions shown in Tables 1 and 2 are defined so as to obtain target compositions shown in Tables 3 and 4 below.

First, each raw material shown in Tables 1 and 2 was weighed out. The weighed raw materials were heated and melted using a high frequency induction furnace to obtain a molten alloy. Si alloy particles were prepared from the molten alloy by a gas atomization method. An argon atmosphere was used as an atmosphere during the preparation of the molten alloy and the gas atomization. In addition, during the gas atomization, high-pressure (4 MPa) argon gas was sprayed onto the molten alloy falling like a rod in the atomization chamber. The obtained Si alloy particles were mechanically finely pulverized using a wet bead mill to obtain a Si alloy powder for a negative electrode.

For Examples 6 to 12, a SiV alloy and a SnY alloy were separately prepared by atomization, and a Si powder, a SiV alloy powder, and a SnY alloy powder were mixed and pulverized to prepare a Si alloy powder for a negative electrode.

TABLE 1

| | | Chemical composition (mass %) | | | | |
|---|---|---|---|---|---|---|
| | | Si | Element X | Sn | Al | Element Y |
| Example | 1 | 85.2 | B: 4.8 | 6.0 | — | Cu: 4.0 |
| | 2 | 84.8 | C: 5.2 | 6.0 | — | Cu: 4.0 |
| | 3 | 81.0 | Mg: 9.0 | 6.0 | — | Cu: 4.0 |
| | 4 | 77.6 | Ca: 12.4 | 6.0 | — | Cu: 4.0 |
| | 5 | 75.8 | V: 14.2 | 6.0 | — | Cu: 4.0 |
| | 6 | 75.8 | V: 14.2 | 6.8 | — | Fe: 3.2 |
| | 7 | 75.8 | V: 14.2 | 8.0 | — | Ni: 2.0 |
| | 8 | 75.8 | V: 14.2 | 8.0 | — | Co: 2.0 |
| | 9 | 75.8 | V: 14.2 | 8.1 | — | Mn: 1.9 |
| | 10 | 75.8 | V: 14.2 | 8.2 | — | Cr: 1.8 |
| | 11 | 75.8 | V: 14.2 | 7.2 | — | Zr: 2.8 |
| | 12 | 75.8 | V: 14.2 | 6.7 | — | Ti: 3.3 |
| | 13 | 71.8 | Sr: 18.2 | 6.0 | — | Cu: 4.0 |
| | 14 | 71.7 | Y: 18.3 | 6.0 | — | Cu: 4.0 |
| | 15 | 71.4 | Nb: 18.6 | 6.0 | — | Cu: 4.0 |
| | 16 | 52.3 | Mo: 37.7 | 6.0 | — | Cu: 4.0 |
| | 17 | 47.6 | Ba: 42.4 | 6.0 | — | Cu: 4.0 |
| | 18 | 44.4 | Ta: 45.6 | 6.0 | — | Cu: 4.0 |
| | 19 | 67.1 | W: 22.9 | 6.0 | — | Cu: 4.0 |
| | 20 | 68.7 | La: 21.3 | 6.0 | — | Cu: 4.0 |
| | 21 | 68.7 | Ce: 21.3 | 6.0 | — | Cu: 4.0 |
| | 22 | 68.5 | Nd: 21.5 | 6.0 | — | Cu: 4.0 |
| | 23 | 68.3 | Sm: 21.8 | 6.0 | — | Cu: 4.0 |
| | 24 | 67.3 | Hf: 22.7 | 6.0 | — | Cu: 4.0 |
| | 25 | 70.8 | Ru: 19.2 | 6.0 | — | Cu: 4.0 |
| | 26 | 63.8 | Cu: 26.2 | 6.0 | — | Cu: 4.0 |
| | 27 | 75.8 | V: 14.2 | — | 3.0 | Cu: 7.0 |

TABLE 1-continued

| | | Chemical composition (mass %) | | | | |
|---|---|---|---|---|---|---|
| | | Si | Element X | Sn | Al | Element Y |
| | 28 | 75.8 | V: 14.2 | — | 5.9 | Fe: 4.1 |
| | 29 | 75.8 | V: 14.2 | — | 5.8 | Ni: 4.2 |
| | 30 | 75.8 | V: 14.2 | — | 4.7 | Zr: 5.3 |
| | 31 | 75.8 | V: 14.2 | — | 6.3 | Ti: 3.7 |

TABLE 2

| | | Chemical composition (mass %) | | | | |
|---|---|---|---|---|---|---|
| | | Si | Element X | Sn | Al | Element Y |
| Example | 32 | 75.8 | V: 14.2 | 6.0 | — | Cu: 4.0 |
| | 33 | 75.8 | V: 14.2 | 6.0 | — | Cu: 4.0 |
| | 34 | 71.1 | V: 18.9 | 6.0 | — | Cu: 4.0 |
| | 35 | 80.6 | V: 9.4 | 6.0 | — | Cu: 4.0 |
| | 36 | 71.6 | V: 1.4 | 16.2 | — | Cu: 10.8 |
| | 37 | 79.0 | V: 17.0 | 2.4 | — | Cu: 1.6 |
| | 38 | 80.1 | V: 17.9 | 1.2 | — | Cu: 0.8 |
| | 39 | 80.6 | V: 18.4 | 0.6 | — | Cu: 0.4 |
| Comparative Example | 1 | 75.8 | V: 14.2 | 6.0 | — | Cu: 4.0 |
| | 2 | 81.1 | V: 18.9 | — | — | — |
| | 3 | 60.0 | — | 24.0 | — | Cu: 16.0 |
| | 4 | 51.7 | V: 28.3 | 12.0 | — | Cu: 8.0 |
| | 5 | 98.8 | V: 0.7 | 0.3 | — | Cu: 0.2 |

2. Preparation of Coin-type Battery for Charging/Discharging Test

One hundred parts by mass of the prepared Si alloy powder for a negative electrode as a negative electrode active material, 6 parts by mass of Ketjen black (manufactured by Lion Corporation) as a conductive agent, and 19 parts by mass of a polyimide (thermoplastic resin) binder as a binder were blended and mixed with N-methyl-2-pyrrolidone (NMP) as a solvent to prepare each paste including the Si alloy powder for a negative electrode.

Subsequently, each coin-type half cell was prepared as follows. Here, for sake of simple evaluation, an electrode prepared using a Si alloy powder for a negative electrode was used as a test electrode, and a Li foil was used as a counter electrode. First, each paste was applied to a surface of a SUS316L (JIS G 4305:2012) foil (thickness: 20 μm) as a negative electrode current collector using a doctor blade method so as to have a thickness of 50 μm, followed by drying to form each negative electrode active material layer. After formation, the negative electrode active material layer was densified by roll pressing. Accordingly, test electrodes according to Examples and Comparative Examples were prepared.

Next, each of the test electrodes according to Examples and Comparative Examples was punched into a disc shape having a diameter of 11 mm to obtain a test electrode.

Next, a Li foil (thickness: 500 μm) was punched into substantially the same shape as the test electrode to prepare a counter electrode. A non-aqueous electrolytic solution was prepared by dissolving $LiPF_6$ at a concentration of 1 mol/l in an equivalent mixed solvent of ethylene carbonate (EC) and diethyl carbonate (DEC).

Next, each test electrode was housed in a corresponding positive electrode can (each test electrode is one to be a negative electrode in a lithium-ion battery, but when the counter electrode is a Li foil, the Li foil is the negative electrode, and the test electrode is the positive electrode), a counter electrode was housed in a corresponding negative electrode can, and a polyolefin-based microporous film separator was disposed between the test electrode and the counter electrode.

Next, the above non-aqueous electrolytic solution was injected into a corresponding can, and the negative electrode can and the positive electrode can were crimped and fixed to each other.

3. Evaluation for Si Alloy Powder for Negative Electrode
3-1. Confirmation of Composition Phase of Si Alloy Powder for Negative Electrode The Si alloy powder for a negative electrode prepared in each of Examples and Comparative Examples was analyzed by XRD (X-ray diffraction) to confirm whether a Si phase, a SiX compound phase, and a SnY compound phase were included. For the XRD analysis, a Co tube was used and an angle range of 120° to 20° was measured.

3-2. Calculation of Proportions of Si Phase, SiX Compound Phase, and SnY Compound Phase (or AlY Compound Phase)

A method for calculating the proportions of the Si phase, the SiX compound phase, and the SnY compound phase (or the AlY compound phase) shown in Tables 3 and 4 below is described using Example 1 as an example.

(1) First, the composition phases in the prepared Si alloy powder for a negative electrode are confirmed. In the case of Example 1, as a result of the XRD analysis, Si, $Si_2B$, and $Sn_5Cu_6$ were confirmed.

(2) $Si_2B$ is 83.9[Si]-16.1[B] in terms of ratio in mass %. Correspondingly, the amount of compounded Si is 4.8×83.9/16.1=25.0%. Therefore, the proportion of the SiX compound phase ($Si_2B$) is the total of the amount of compounded Si (25.0%) and the amount of B (4.8%) in Table 1, and is 30% in this example.

(3) The proportion of the Si phase is a value obtained by subtracting the amount of compounded Si (25.0%) from the amount of entire Si (85.2%) in Table 1, and is 60% in this example.

(4) The proportion of the SnY compound phase is the total of the amount of Sn (6.0%) and the amount of Cu (4.0%) in Table 1, and is 10% in this example.

TABLE 3

| | | Target composition phase | Type of SiX phase | Proportion (mass %) of phase | | | |
|---|---|---|---|---|---|---|---|
| | | | | Si | SiX | SnY | AlY |
| Example | 1 | 60[Si]-30[Si$_2$B]-10[Sn$_5$Cu$_6$] | Si$_2$B | 60 | 30 | 10 | 0 |
| | 2 | 60[Si]-30[Si$_2$C]-10[Sn$_5$Cu$_6$] | Si$_2$C | 60 | 30 | 10 | 0 |
| | 3 | 60[Si]-30[Si$_2$Mg]-10[Sn$_5$Cu$_6$] | Si$_2$Mg | 60 | 30 | 10 | 0 |
| | 4 | 60[Si]-30[Si$_2$Ca]-10[Sn$_5$Cu$_6$] | Si$_2$Ca | 60 | 30 | 10 | 0 |
| | 5 | 60[Si]-30[Si$_2$V]-10[Sn$_5$Cu$_6$] | Si$_2$V | 60 | 30 | 10 | 0 |
| | 6 | 60[Si]-30[Si$_2$V]-10[SnFe] | Si$_2$V | 60 | 30 | 10 | 0 |
| | 7 | 60[Si]-30[Si$_2$V]-10[Sn$_2$Ni] | Si$_2$V | 60 | 30 | 10 | 0 |
| | 8 | 60[Si]-30[Si$_2$V]-10[Sn$_2$Co] | Si$_2$V | 60 | 30 | 10 | 0 |
| | 9 | 60[Si]-30[Si$_2$V]-10[Sn$_2$Mn] | Si$_2$V | 60 | 30 | 10 | 0 |
| | 10 | 60[Si]-30[Si$_2$V]-10[Sn$_2$Cr] | Si$_2$V | 60 | 30 | 10 | 0 |
| | 11 | 60[Si]-30[Si$_2$V]-10[Sn$_2$Zr] | Si$_2$V | 60 | 30 | 10 | 0 |
| | 12 | 60[Si]-30[Si$_2$V]-10[Sn$_5$Ti$_6$] | Si$_2$V | 60 | 30 | 10 | 0 |
| | 13 | 60[Si]-30[Si$_2$Sr]-10[Sn$_5$Cu$_6$] | Si$_2$Sr | 60 | 30 | 10 | 0 |
| | 14 | 60[Si]-30[Si$_2$Y]-10[Sn$_5$Cu$_6$] | Si$_2$Y | 60 | 30 | 10 | 0 |
| | 15 | 60[Si]-30[Si$_2$Nb]-10[Sn$_5$Cu$_6$] | Si$_2$Nb | 60 | 30 | 10 | 0 |
| | 16 | 30[Si]-60[Si$_2$Mo]-10[Sn$_5$Cu$_6$] | Si$_2$Mo | 30 | 60 | 10 | 0 |
| | 17 | 30[Si]-60[Si$_2$Ba]-10[Sn$_5$Cu$_6$] | Si$_2$Ba | 30 | 60 | 10 | 0 |
| | 18 | 30[Si]-60[Si$_2$Ta]-10[Sn$_5$Cu$_6$] | Si$_2$Ta | 30 | 60 | 10 | 0 |
| | 19 | 60[Si]-30[Si$_2$W]-10[Sn$_5$Cu$_6$] | Si$_2$W | 60 | 30 | 10 | 0 |
| | 20 | 60[Si]-30[Si$_2$La]-10[Sn$_5$Cu$_6$] | Si$_2$La | 60 | 30 | 10 | 0 |
| | 21 | 60[Si]-30[Si$_2$Ce]-10[Sn$_5$Cu$_6$] | Si$_2$Ce | 60 | 30 | 10 | 0 |
| | 22 | 60[Si]-30[Si$_2$Nd]-10[Sn$_5$Cu$_6$] | Si$_2$Nd | 60 | 30 | 10 | 0 |
| | 23 | 60[Si]-30[Si$_2$Sm]-10[Sn$_5$Cu$_6$] | Si$_2$Sm | 60 | 30 | 10 | 0 |
| | 24 | 60[Si]-30[Si$_2$Hf]-10[Sn$_5$Cu$_6$] | Si$_2$Hf | 60 | 30 | 10 | 0 |

| | | SiX/(SnY + AlY) | Average particle diameter (μm) | Initial discharge capacity (mAh/g) | Cycle characteristics (%) |
|---|---|---|---|---|---|
| Example | 1 | 3 | 4.2 | A (475) | A (88) |
| | 2 | 3 | 4.5 | A (493) | A (87) |
| | 3 | 3 | 4.1 | A (511) | A (87) |
| | 4 | 3 | 4.2 | A (487) | A (87) |
| | 5 | 3 | 4.3 | A (472) | A (88) |
| | 6 | 3 | 4.2 | A (477) | A (83) |
| | 7 | 3 | 3.9 | A (481) | A (80) |
| | 8 | 3 | 4.4 | A (471) | A (82) |
| | 9 | 3 | 4.5 | A (469) | A (80) |
| | 10 | 3 | 4.7 | A (479) | A (81) |
| | 11 | 3 | 3.8 | A (488) | A (83) |
| | 12 | 3 | 4.2 | A (470) | A (82) |
| | 13 | 3 | 4.9 | A (463) | A (86) |
| | 14 | 3 | 4.7 | A (480) | A (87) |
| | 15 | 3 | 4.3 | A (460) | A (86) |
| | 16 | 6 | 4.5 | A (469) | A (87) |
| | 17 | 6 | 4.6 | A (468) | A (85) |
| | 18 | 6 | 4.8 | A (464) | A (87) |
| | 19 | 3 | 4.2 | A (470) | A (92) |
| | 20 | 3 | 4.4 | A (465) | A (87) |
| | 21 | 3 | 4.7 | A (473) | A (90) |

TABLE 3-continued

| | | | | | |
|---|---|---|---|---|---|
| | 22 | 3 | 4.1 | A (476) | A (88) |
| | 23 | 3 | 4.1 | A (472) | A (86) |
| | 24 | 3 | 4.2 | A (463) | A (86) |

TABLE 4

| | | Target composition phase | Type of SiX phase | Proportion (mass %) of phase | | | |
|---|---|---|---|---|---|---|---|
| | | | | Si | SiX | SnY | AlY |
| Example | 25 | 60[Si]-30[Si$_2$Ru]-10[Sn$_5$Cu$_6$] | Si$_2$Ru | 60 | 30 | 10 | 0 |
| | 26 | 60[Si]-30[Cu$_3$Si]-10[Sn$_5$Cu$_6$] | Cu$_3$Si | 60 | 30 | 10 | 0 |
| | 27 | 60[Si]-30[Si$_2$V]-10[AlCu] | Si$_2$V | 60 | 30 | 0 | 10 |
| | 28 | 60[Si]-30[Si$_2$V]-10[Al$_3$Fe] | Si$_2$V | 60 | 30 | 0 | 10 |
| | 29 | 60[Si]-30[Si$_2$V]-10[Al$_3$Ni] | Si$_2$V | 60 | 30 | 0 | 10 |
| | 30 | 60[Si]-30[Si$_2$V]-10[Al$_3$Zr] | Si$_2$V | 60 | 30 | 0 | 10 |
| | 31 | 60[Si]-30[Si$_2$V]-10[Al$_3$Ti] | Si$_2$V | 60 | 30 | 0 | 10 |
| | 32 | 60[Si]-30[Si$_2$V]-10[Sn$_5$Cu$_6$] | Si$_2$V | 60 | 30 | 10 | 0 |
| | 33 | 60[Si]-30[Si$_2$V]-10[Sn$_5$Cu$_6$] | Si$_2$V | 60 | 30 | 10 | 0 |
| | 34 | 50[Si]-40[Si$_2$V]-10[Sn$_5$Cu$_6$] | Si$_2$V | 50 | 40 | 10 | 0 |
| | 35 | 70[Si]-20[Si$_2$V]-10[Sn$_5$Cu$_6$] | Si$_2$V | 70 | 20 | 10 | 0 |
| | 36 | 70[Si]-3[Si$_2$V]-27[Sn$_5$Cu$_6$] | Si$_2$V | 70 | 3 | 27 | 0 |
| | 37 | 60[Si]-36[Si$_2$V]-4[Sn$_5$Cu$_6$] | Si$_2$V | 60 | 36 | 4 | 0 |
| | 38 | 60[Si]-38[Si$_2$V]-2[Sn$_5$Cu$_6$] | Si$_2$V | 60 | 38 | 2 | 0 |
| | 39 | 60[Si]-39[Si$_2$V]-1[Sn$_5$Cu$_6$] | Si$_2$V | 60 | 39 | 1 | 0 |
| Comparative Example | 1 | 60[Si]-30[Si$_2$V]-10[Sn$_5$Cu$_6$] | Si$_2$V | 60 | 30 | 10 | 0 |
| | 2 | 60[Si]-40[Si$_2$V] | Si$_2$V | 60 | 40 | 0 | 0 |
| | 3 | 60[Si]-40[Sn$_5$Cu$_6$] | — | 60 | 0 | 40 | 0 |
| | 4 | 20[Si]-60[Si$_2$V]-20[Sn$_5$Cu$_6$] | Si$_2$V | 20 | 60 | 20 | 0 |
| | 5 | 98[Si]-1.5[Si$_2$V]-0.5[Sn$_5$Cu$_6$] | Si$_2$V | 98 | 1.5 | 0.5 | 0 |

| | | SiX/(SnY + AlY) | Average particle diameter (μm) | Initial discharge capacity (mAh/g) | Cycle characteristics (%) |
|---|---|---|---|---|---|
| Example | 25 | 3 | 4.2 | A (442) | A (87) |
| | 26 | 3 | 4.1 | A (469) | A (85) |
| | 27 | 3 | 4.3 | A (461) | B (78) |
| | 28 | 3 | 4.5 | A (451) | B (76) |
| | 29 | 3 | 4.6 | A (472) | B (75) |
| | 30 | 3 | 4.6 | A (464) | B (77) |
| | 31 | 3 | 4.2 | A (470) | B (75) |
| | 32 | 3 | 0.8 | A (481) | AA (95) |
| | 33 | 3 | 0.5 | A (474) | AA (96) |
| | 34 | 4 | 3.4 | A (481) | AA (95) |
| | 35 | 2 | 5.4 | AA (681) | B (77) |
| | 36 | 0.1 | 4.6 | A (472) | A (85) |
| | 37 | 9 | 4.9 | A (451) | A (88) |
| | 38 | 19 | 4.9 | A (451) | A (88) |
| | 39 | 39 | 4.9 | A (451) | A (88) |
| Comparative Example | 1 | 3 | 40.1 | A (464) | C (62) |
| | 2 | — | 4.5 | A (456) | C (69) |
| | 3 | — | 4.4 | A (484) | C (68) |
| | 4 | 3 | 3.9 | C (381) | A (93) |
| | 5 | 3 | 3.7 | AA (751) | D (47) |

3-3. Measurement of Average Particle Diameter of Si Alloy Powder for Negative Electrode The average particle diameter (d50) of each Si alloy powder for a negative electrode was measured by a laser diffraction method using a particle diameter distribution analyzer (Microtrac MT3000 manufactured by NIKKISO CO., LTD.).

3-4. Charging/Discharging Test

One cycle including constant current charging/discharging at a current value of 0.2 mA was performed using each of the prepared coin batteries. The initial discharge capacity $C_0$ (mAh/g) was calculated based on the value obtained by dividing the capacity (mAh) used for releasing Li by the amount (g) of the active material.

Regarding determination on the initial discharge capacity (mAh/g), a case of 600 or more is determined as "AA", a case of 400 to less than 600 is determined as "A", and a case of less than 400 is determined as "C". The results are shown in Tables 3 and 4.

After the second cycle of the charging/discharging test, the charging/discharging test was performed at a 1/5C rate (C rate: the current value for charging/discharging an amount of electricity $C_0$ required to charge/discharge the electrode in 1 hour is defined as 1C. 5C means charging/discharging in 12 minutes, and 1/5C means charging/discharging in 5 hours.). Then, the cycle characteristics were evaluated by performing the charging/discharging cycle 100 times. A capacity retention rate (discharge capacity after 100 cycles/initial discharge capacity (discharge capacity at first cycle)×100) was obtained from each of the obtained discharge capacities. Then, regarding determination on the capacity retention rate, a case of 95% or more is determined as "AA", a case of 80% to less than 95% determined as "A", a case of 70% to less than 80% determined as "B", a case of 50% to less than 70% determined as "C", and a case of less than 50% determined as "D". The results are shown in Tables 3 and 4.

The results in Tables 3 and 4 obtained as described above show the following.

In Comparative Example 1, the average particle diameter is more than the upper limit (30 μm) defined in the present embodiment, and the evaluation on the cycle characteristics is "C".

Comparative Example 2 is an example that includes no SnY phase, and the evaluation on the cycle characteristics is "C".

Comparative Example 3 is an example that includes no SiX phase, and the evaluation on the cycle characteristics is "C".

In Comparative Example 4, the amount of the Si phase is less than the lower limit (30%) specified in the present embodiment, and the evaluation on the initial discharge capacity is "C".

In Comparative Example 5, the amount of the Si phase is more than the upper limit (95%) specified in the present embodiment, and the evaluation on the cycle characteristics is "D".

As described above, in Comparative Examples 1 to 5, the evaluation on either the initial discharge capacity or the cycle characteristics is "C" or "D", and battery characteristics in consideration of the initial discharge capacity and the cycle characteristics have not been sufficiently improved.

In contrast, it is seen that in Examples in which the Si alloy powder for a negative electrode includes a Si phase, a SiX compound phase, and at least one of a SnY compound phase and a AlY compound phase, the average particle diameter is 30 μm or less, and the amount of the Si phase in the entire Si alloy is 30 mass % to 95 mass %, there is no evaluation of "C" or "D" in either the initial discharge capacity or the cycle characteristics, and the battery characteristics in consideration of the initial discharge capacity and the cycle characteristics are improved.

Next, Examples shown in Table 5 below are examples in which the Si phase, the Six compound phase, and the SnY compound phase are separated, and the average particle diameter ratio of each phase is controlled. Si particles, SiX compound particles, and SnY compound particles were formed separately, and these particles were pulverized to have a predetermined particle diameter and then mixed to prepare a Si alloy powder for a negative electrode.

Si alloy powders in Examples 31 to 35 each had an average particle diameter of 0.1 μm or more and 30 μm or less.

Particle diameters (diameters of equivalent circle) of 100 particles of each of the Si phase, the SiX compound phase, and the SnY compound phase that were present separately were measured from a cross-sectional SEM image (magnification: 5000 times) of powders thereof, the particle diameter at 50% integrated value in each particle diameter distribution was defined as the average particle diameter mdSi, mdSiX, and mdSnY of corresponding phases. Table 5 shows the average particle diameters mdSi, mdSiX, mdSnY of corresponding phases obtained in this way and values of the average particle diameter ratios mdSi/mdSiX and mdSi/mdSnY, together with the results of the charging/discharging test.

TABLE 5

| | Target composition phase | Type of SiX phase | Proportion (mass %) of phase | | | | SiX/(SnY + AlY) |
| --- | --- | --- | --- | --- | --- | --- | --- |
| | | | Si | SiX | SnY | AlY | |
| Example 31 | 60[Si]-30[Si$_2$B]-10[Sn$_5$Cu$_6$] | Si$_2$B | 60 | 30 | 10 | 0 | 3 |
| 32 | 60[Si]-30[Si$_2$B]-10[Sn$_5$Cu$_6$] | Si$_2$B | 60 | 30 | 10 | 0 | 3 |
| 33 | 60[Si]-30[Si$_2$V]-10[Sn$_5$Cu$_6$] | Si$_2$V | 60 | 30 | 10 | 0 | 3 |
| 34 | 60[Si]-30[Si$_2$V]-10[Sn$_5$Cu$_6$] | Si$_2$V | 60 | 30 | 10 | 0 | 3 |

| | Average particle diameter (μm) | | | Average particle diameter ratio | | Initial discharge capacity (mAh/g) | Cycle characteristics (%) |
| --- | --- | --- | --- | --- | --- | --- | --- |
| | Si | SiX | SnY | Si/SiX | Si/SnY | | |
| Example 31 | 4.0 | 4.0 | 4.6 | 1.0 | 0.9 | A (475) | A (92) |
| 32 | 0.6 | 0.7 | 1.1 | 0.9 | 0.5 | A (475) | AA (97) |
| 33 | 4.1 | 4.2 | 4.7 | 1.0 | 0.9 | A (472) | A (94) |
| 34 | 0.7 | 0.9 | 1.3 | 0.8 | 0.5 | A (472) | AA (98) |

The results in Table 5 obtained as described above show the following.

When Examples 31 and 32 are compared with Example 1 having the same composition, they have the same initial discharge capacity, but Examples 31 and 32 have a higher value of cycle characteristics. In addition, when Examples 33 and 34 are compared with Example 5 having the same composition, they also have the same initial discharge capacity, but have a higher value of cycle characteristics. Therefore, it can be seen that separating the Si phase, the SiX compound phase, and the SnY compound phase and controlling the average particle diameter ratio of each phase (specifically, controlling the average particle diameter ratios represented by mdSi/mdSiX and mdSi/mdSnY both within a range of 0.1 to 5.0) is effective in improving the cycle characteristics.

Although the Si alloy powder for a negative electrode and the lithium-ion battery according to the present invention have been described in detail above, the present invention is not limited to the above embodiments and examples. For example, the Si alloy powder for a negative electrode according to the present invention can be applied not only to a negative electrode material powder for a liquid lithium-ion battery as in the above embodiment, but also to a negative electrode material powder for an all-solid lithium-ion battery. Various modifications can be made to the present invention without departing from the gist.

The present application is based on Japanese Patent Applications No. 2022-121838 filed on Jul. 29, 2022 and No. 2023-048355 filed on Mar. 24, 2023, and the contents thereof are incorporated herein by reference.

What is claimed is:

1. A Si alloy powder for a negative electrode, the Si alloy powder comprising:
   a Si phase;
   a SiX compound phase; and
   at least one selected from the group consisting of a SnY compound phase and a AlY compound phase, wherein
   the element Y in the SnY compound phase and the AlY compound phase comprises at least one element selected from the group consisting of Cu, Fe, Ni, Cr, Co, Mn, Zr, and Ti,
   the Si alloy powder has an average particle diameter of 30 μm or less, and
   an amount of the Si phase in an entire Si alloy is 30 mass % to 95 mass %,
   wherein the element X in the Six compound phase comprises at least one element selected from the group consisting of B, C, Mg, Ca, and V.

2. The Si alloy powder for a negative electrode according to claim 1, having a mass ratio represented by [SiX compound]/([SnY compound]+[AlY compound]) of 0.1 to 39 when [M compound] represents a content of a M compound in mass % basis.

3. The Si alloy powder for a negative electrode according to claim 1, wherein the average particle diameter is 1 μm or less, and the mass ratio represented by [SiX compound]/([SnY compound]+[AlY compound]) is 1 to 39 when [M compound] represents a content of a M compound in mass % basis.

4. The Si alloy powder for a negative electrode according to claim 1,
   wherein the Si phase, the Six compound phase, and the at least one selected from the group consisting of a SnY compound phase and a AlY compound phase are separately present in a separate state, and
   wherein when average particle diameters of the Si phase, the SiX compound phase, and the SnY compound phase are respectively mdSi, mdSiX, and mdSnY,
   the average particle diameters mdSi, mdSiX, and mdSnY are all within a range of 0.1 μm to 30 μm, and
   average particle diameter ratios represented by mdSi/mdSiX and mdSi/mdSnY are both within a range of 0.1 to 5.0,
   provided that when the AlY compound phase is contained, the average particle diameter mdSnY indicates an average particle diameter of the SnY compound phase and the AlY compound phase.

5. A Si alloy powder for a negative electrode, the Si alloy powder comprising:
   a Si phase;
   a SiX compound phase; and
   at least one selected from the group consisting of a SnY compound phase and a AlY compound phase, wherein
   the element Y in the SnY compound phase and the AlY compound phase comprises at least one element selected from the group consisting of Cu, Fe, Ni, Cr, Co, Mn, Zr, and Ti,
   the Si alloy powder has an average particle diameter of 30 μm or less, and
   an amount of the Si phase in an entire Si alloy is 30 mass % to 95 mass %,
   wherein the element X in the SiX compound phase comprises at least one element selected from the group consisting of Sr, Y, Nb, Mo, and Ba.

6. A Si alloy powder for a negative electrode, the Si alloy powder comprising:
   a Si phase;
   a SiX compound phase; and
   at least one selected from the group consisting of a SnY compound phase and a AlY compound phase, wherein
   the element Y in the SnY compound phase and the AlY compound phase comprises at least one element selected from the group consisting of Cu, Fe, Ni, Cr, Co, Mn, Zr, and Ti,
   the Si alloy powder has an average particle diameter of 30 μm or less, and
   an amount of the Si phase in an entire Si alloy is 30 mass % to 95 mass %,
   wherein the element X in the Six compound phase comprises at least one element selected from the group consisting of Ta, W, La, Ce, and Nd.

7. A Si alloy powder for a negative electrode, the Si alloy powder comprising:
   a Si phase;
   a SiX compound phase; and
   at least one selected from the group consisting of a SnY compound phase and a AlY compound phase, wherein
   the element Y in the SnY compound phase and the AlY compound phase comprises at least one element selected from the group consisting of Cu, Fe, Ni, Cr, Co, Mn, Zr, and Ti,
   the Si alloy powder has an average particle diameter of 30 μm or less, and
   an amount of the Si phase in an entire Si alloy is 30 mass % to 95 mass %,
   wherein the element X in the SiX compound phase comprises at least one element selected from the group consisting of Sm, Hf, Ru, and Cu.

* * * * *